United States Patent Office 3,843,443
Patented Oct. 22, 1974

3,843,443
POLYPEPTIDE MATERIALS BOUND TO FLUOROCARBON POLYMERS
Jerry Haskel Fishman, 227 Central Park W., New York, N.Y. 10024
No Drawing. Filed Mar. 30, 1973, Ser. No. 346,353
Int. Cl. C07g 7/02
U.S. Cl. 195—63                                    9 Claims

ABSTRACT OF THE DISCLOSURE

Polypeptitde materials such as enzymes are absorbed directly to the surface of porous unsintered fluorocarbon polymers such as polytetrafluoroethylene.

BACKGROUND

The present invention relates to polypeptide materials and more particularly, to bound polypeptide materials and their method of manufacture.

The number and diversity of available proteins and polypeptides has made them increasingly useful in a variety of applications. One of the major areas of commercial interest has been in food processing where soluble or unbound enzymes have been used to catalyze reactions such as the isomerization of starch to dextrose and dextrose to fructose. Other processes utilizing unbound enzymes include beer chillproofing, cheese production, and resolution of amino acids. The major disadvantage of using unbound enzymes is that they are unrecoverable or not economically recoverable, and thus, they can only be used once. Consequently, only those enzymes which are relatively inexpensive have commercial use. In an effort to increase the number of available enzymes, whose use is economically feasible, the prior art has focused on immobilizing the enzyme upon a carrier by attaching it to an insoluble support, thus allowing the enzyme to be recovered. Toward this end, enzymes have been immobilized, for example, upon glass beads having a silane coating to which the enzyme is bound, or alternatively, the enzymes has been incorporated into insoluble gels. These techniques, however, have been only partially successful because insolubilization of the enzyme is frequently accompanied by a reduction of its activity after repeated use, as well as a mechanical degradation of the supported enzyme material after repeated or long term use. Hence, there is a need for bound polypeptide materials capable of operating effectively in a wide range of chemical and biological environments and over a broad temperature range, without substantially altering their mechanical or chemical properties.

Another area of interest for polypeptides concerns permselective materials. Among the uses which have been found for permselective materials are the separation of ions having different electron charges; the purification of brackish water by removing the salt therefrom; the demineralization of proteins; the chromatographic separation of disparate materials; and general dialysis applications. The effectiveness of proteins and polypeptides as components of permselective materials is recognized, but, to date, the absence of a bound polypeptide material with good mechanical properties, such as structural strength under wet conditions, as well as good chemical efficiency, i.e., high ion-exchange capacity uniformly distributed throughout the material, has precluded their commercial use.

Permselective materials known in the art, such as membranes activated with polyelectrolyte polymers generally exhibit poor chemical stability, namely, the polyelectrolyte and/or the supporting structure is chemically attacked in acids and bases and the polyelectrolyte is readily leached from its supporting structure in the presence of watersoluble organic solvents such as acetone. In an effort to provide permselective membranes suitable for commercial use, the prior art has focused on methods of binding the chemically active component, i.e., the ion-exchange groups, to the inert matrix or supporting film, in a homogeneous manner. U.S. Pat. No. 3,467,604 to Michaels describes a composite product comprising a hydrophobic organic polymer such as polytetrafluorethylene having dispersed therein finely divided particles of an ionically cross-linked polyelectrolyte. The ionic association resulting from the cross-linking of the linear polymers is intended to render the polyelectrolyte more resistant to chemical attack and to high temperatures. Likewise, in U.S. Pat. No. 3,247,133 a homogeneous ion-exchange material is disclosed comprising an essentially unreactive fluoropolymer containing an active organic appendage which forms a polyelectrolyte, characterized by the fact that ionizing radiation is used to graft the active polymeric groups to the suface of the inert fluoropolymer. The ionizing radiation serves to enhance the chemical stability of the ion-exchange material and to prevent the polyelectrolyte from going into solution in organic solvents.

Although these compositions have, in general, shown improved resistance to chemical attack and thermal degradation they, nevertheless, have the disadvantage of being prepared by relatively complex methods. More importantly, the achievement of improved homogeneity and chemical stability of these materials generally requires chemical reactions to firmly bind the active ion-exchange groups to the supporting skeletal structure. Consequently, some of the mechanical properties of the supporting material or matrix are adversely affected.

OBJECTS

Accordingly, it is an object of the invention to provide a bound polypeptide material.

It is another object of this invention to provide a bound polypeptide material characterized by a high resistance to chemical and thermal degradation.

It is still another object of this invention to provide a process for preparing a bound polypeptide material comprising an unsintered fluorocarbon polymer forming a supporting matrix for a polypeptide polyelectrolyte.

SUMMARY OF THE INVENTION

These and other objects, which will become apparent from the detailed disclosure and claims to follow, are achieved by the present invention, one aspect of which comprises: a bound polypeptide material comprising a porous unsintered fluorocarbon polymer having an atomic ratio of carbon to fluorine of from about 0.5 to about 2.0, and a polypeptide polyelectrolyte, said polypeptide polyelectrolyte being bound to at least a portion of the surface of said unsintered fluorocarbon polymer.

Another aspect of the present invention is a process for producing a bound polypeptide material comprising the steps of:

(1) providing a porous unsintered fluorocarbon polymer having an atomic ratio of carbon to fluorine of from about 0.5 to 2.0, (2) flooding said unsintered porous polymer with a water-miscible organic solvent, and (3) contacting the flooded unsintered polymer produced in step (2) with an aqueous solution of polypeptide polyelectrolyte for a length of time sufficient to replace at least a portion of said organic solvent with said aqueous solution of polypeptide polyelectrolyte.

In an alternative embodiment of the process of the invention, the unsintered fluorocarbon polymer flooded with organic solvent in step (2), is subsequently flooded with water prior to contacting same with the solution of protein polyelectrolyte in order not to contaminate the aqueous polypeptide solution with an organic solvent.

The term "polypeptide polyelectrolyte" as used herein refers to a linear polymer containing a plurality of polypeptide groups, specifically, polyamides of alpha-amino acids characterized by a recurring unit having the formula:

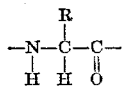

where: R=the amino acid residue comprising either polar groups such as OH, COOH, $NH_2$ and SH, or non-polar groups such as hydrocarbons. Thus, polypeptide polyelectrolytes comprise natural and synthetic proteins including hemoglobin, albumin, gelatin, casein and a broad range of enzymes and hormones such as pepsin, ribonucleose, lysozyme, insulin and cytochrome C.

The term "unsintered" as used herein refers to the fact that the fluorocarbon polymer in question has not been heat treated at or above its crystalline melting point. Generally, the characteristics of an unsintered polymer film are substantially modified if sintering occurs, i.e., if it is heated at or above its crystalline melting point. Sintered PTFE, for example, is less porous, less flexible, will not stretch extensively and will diffuse only a limited amount of gas as compared to an unsintered PTFE film. In addition, sintered PTFE, unless purposely rendered porous in the fabrication process, is not "flooded" by organic liquids such as, ethyl alcohol, which readily flood unsintered PTFE. The crystalline melting points of some fluorocarbon polymers useful in the present invention are given below:

Polytetrafluoroethylene (PTFE) _____ 327° C.
Polychlorotrifluoroethylene (CTFE) _____ 213° C.
Polyvinyl fluoride (PVF) _____ 198° C.–200° C.
Polyvinylidenefluoride ($PVF_2$) _____ 171° C.

It should be noted that the term "unsintered" is also meant to include sintered polymeric films which are subsequently reconverted, in whole or in part, to the unsintered state. This can be accomplished, for example, with sintered porous film of polyvinylidenefluoride ($PVF_2$), when a partial solvent, such as acetone, is used to flood the sintered polymeric film and the solvent thereafter removed to yield an essentially sintered film with an unsintered surface corresponding to the portion of the film contacted by the solvent.

The fluorinated polymers useful for the present invention cover a wide range of compositions corresponding to an atomic ratio of carbon to fluorine of from about 0.5 to 2.0. Thus, suitable supporting matrices include PTFE having an atomic ratio of carbon to fluorine of about 0.5, and polyvinyl fluoride wherein the corresponding atomic ratio of carbon to fluorine is about 2. PTFE is the preferred supporting matrix because it possesses to a superior degree the combination of properties, such as, chemical inertness, non-toxicity, thermal stability and resistance to attack by micro-organisms and enzymes.

The bound polypeptide material of the present invention need not necessarily be in the form of a continuous film or membrane, but, depending on the desired use, may also be in the form of powder, rods, or pellets and the life.

The "flooding" of a fluorocarbon membrane as that term is used herein refers to the technique of filling the pores of the membrane with liquid. Thus, for the case of a hydrophobic membrane which is not "wetted" by water, a water-miscible organic solvent such as acetone or alcohol is used to initially contact the membrane and fill its pores with liquid. Thereafter, the membrane can be impregnated by immersing same in an aqueous solution of the desired polypeptide polyelectrolyte so that the polyelectrolyte solution will replace the water-miscible organic solvent within the voids of the polymeric membrane. Upon becoming flooded, the appearance of the membrane is noticeably changed, namely, the flooded membrane appears translucent as compared to the non-flooded membrane which is relatively opaque.

Proteins differ in solubility: some are soluble in pure water, some are insoluble in water but dissolve readily in aqueous salt solution, and some are soluble in alcohol-water mixtures but insoluble either in pure alcohol or pure water. Accordingly, the term "aqueous solution of polypeptide polyelectrolyte" as used herein is intended to encompass all such water containing solvent systems.

DETAILED DESCRIPTION OF THE INVENTION

The invention is predicated on the discovery that porous unsintered fluorocarbon polymers will strongly adsorb protein and polypeptide polyelectrolytes. It had been expected that proteins and polypeptides would be adsorbed on, for example, unsintered polytetrafluoroethylene (PTFE) in the same manner that they are on sintered PTFE, namely, weakly bonded to the surface. Surprisingly, however, proteins are firmly adsorbed on unsintered PTFE to the extent that the adsorbate can not be leached out of the fluorocarbon supporting matrix after repeated washings in water or organic solvents such as alcohol. In other words, the unsintered fluorocarbon binds the protein to its surface to form an insoluble or bound polypeptide material. The usefulness of such a bound polypeptide material is that it comprises an inert support material such that the polypeptide is not desorbed even after substantial periods of time and use of the bound polypeptide material. For example, unlike porous sintered PTFE, an unsintered PTFE film impregnated with a protein polyelectrolyte can function as a permselective membrane for relatively long periods of time without any appreciable decrease in its ion-exchange capacity.

The nature and properties of the composite bound polypeptide material are a function of the fluorocarbon polymer matrix and the polypeptide bound thereto. Although the precise mechanism by which the protein is bound to the unsintered fluorocarbon surface is not fully understood, it is, however, known that the supporting matrix must be sufficiently porous, at least at the surface, to allow the protein to penetrate the material and become anchored to at least a portion of its surface; the term "surface" being used herein to refer to the apparent external surface of the fluorocarbon polymer as well as the surface of the pores extending within said fluorocarbon support. Hence, the larger the polypeptide in question, the larger the required pore size of the supporting matrix. Consequently, high molecular weight polypeptides, such as the naturally occurring proteins, are more readily bound to a fluorocarbon having relatively large sized surface pores on the order of 0.1 to 1.0 microns.

Unsintered fluorocarbons, such as PTFE, are intrinsically porous and therefore are well suited as support materials for the bound polypeptide materials described herein. For applications requiring immobilized or bound enzyme catalysts, PTFE is particularly preferred because it possesses the following desirable properties: structural and chemical stability in solvents of varying pH; it is substantially impervious to microbial or enzymatic attack; and it is readily shaped into a wide variety of configurations such as rods, pellets, powder or the like, depending upon the desired application. Thus, for example, enzymes may be bound upon a PTFE film and a reactant solution passed continuously therethrough, or alternatively, the enzyme may be immobilized on pellets or powders and these packed into a column, or the bound enzyme may be simply dispersed in a reaction medium and subsequently recovered by filtration. To modify the mechanical properties of the bound polypeptide material, the fluorocarbon support may optionally be chemically joined to other polymeric materials, to form a block or graft polymer.

The bound polypeptide materials formed by the present invention have many diverse applications. The hydrophobic nature of the fluorocarbons favors membrane electrode applications. Unsintered fluorocarbon films are generally intrinsically porous. When they are only partially impregnated with polypeptides or proteins they remain sufficiently hydrophobic so as not to flood spontaneously upon contact with aqueous solutions. Nevertheless, they exhibit a degree of electrolytic conductivity. That is, although liquid does not grossly penetrate the pores of the membrane, the protein coated pathways become hydrated and can thereby serve as electrolytic bridges when placed between two adjoining solutions. Thus, protein impregnated membranes are particularly useful as membrane electrodes.

Increasing the degree of membrane impregnation decreases the electrolytic resistance of the membrane and also its hydrophobicity. Consequently, the hydrophobicity of the membrane can be reduced to the point where it will flood spontaneously upon contact with aqueous solutions. Thus, by permitting liquid transport through its porous structure, the membrane is useful as a charged membrane for dialytic and electrodialytic applications.

The method of preparing the materials of the present invention is dependent upon the hydrophobicity of the fluorocarbon polymer matrix. Virgin polymeric materials, for example, must generally forcibly flooded for purposes of impregnation. That is to say, strongly hydrophobic membrances which do not flood spontaneously upon contact with aqueous solutions are forcibly flooded by submerging same in a water soluble organic solvent such as ethanol or propanol, and thereafter submerging them in the aqueous polypeptide polyelectrolyte solution. In so doing, the aqueous solution will replace the organic liquid within the pores of the membrane, the degree of impregnation varying directing with the duration of the contact between the membrane and the impregnating solution. With some polymeric materials, such as $PVF_2$, a five minute flooding with 1% hemoglobin solution provides generally a sufficient concentration of protein bound within the membrane that the membrane will flood spontaneously thereafter upon contact with an aqueous solution. Alternatively, a fluorocarbon membrane may be rendered hydrophilic by deliberately incorporating a detergent into the membrane during its fabrication. Thus, the electrochemical properties of a membrane may vary depending upon its degree of hydrophobicity; those membranes which do not flood spontaneously being useful as membrane electrodes while the flooded membranes, whether these are spontaneously or forcibly flooded, are useful as dialysing type membranes. In addition, the membrane properties are dependent upon the structural characteristics of the supporting matrix, (e.g. pore size, pore density, tortuosity) and the nature of the adsorbed protein or polypeptide.

EXAMPLE 1

An unsintered and a porous sintered PTFE film were each flooded with ethyl alcohol and then immediately submerged in a 1% aqueous solution of bovine hemoglobin for a period of four hours. Both films were 0.007 inch thick. Upon removal from the hemoglobin solution the films were rinsed thoroughly with water and then air dried. The unsintered film had a substantially deeper and more uniform grey-pink color than the sintered film. Both films remained sufficiently hydrophobic so as not to flood spontaneously upon contact with water. Both films were forcibly flooded with water by initially flooding them with ethyl alcohol and thereafter immersing them in water. The water-flooded films were thereafter used as separators in an electrolytic cell having a 0.01 molar phosphate solution (pH 3.0) in both chambers. Both films functioned as positively charged membranes when a D.C. current of 0.5 ma. per cm. of film area was passed through the cell. In the cell using the sintered film as a separator, the liquid level in the chamber with the positive electrode was observed to rise due to electroosmotic transport of liquid across the sintered film. After 15 minutes of operation at the same current density the electroosmotic transport of liquid reversed itself, namely, the liquid level in the negative electrode chamber began to rise. This was due to the removal of most of the adsorbed protein from the sintered membrane and the exposure of the PTFE surface, which ordinarily is negatively charged. In the cell using the unsintered film no reversal of electroosmotic flow was observed after 24 hours of operation. Upon removal from the cell, the air-dried sintered film had only a slight residue of its original grey-pink color. No change of color could be detected in the unsintered film.

EXAMPLE 2

An unsintered PTFE film, 0.007 inch thick, was submerged in iso-propyl alcohol until the film became translucent, indicating that it had become flooded with said alcohol. The flooded film was then transferred to a 0.25% (wt.) aqueous protamine solution, the protamine being salmine sulfate. After 30 minutes the film was removed from the protamine solution, rinsed in water and submerged in isopropyl alcohol for five minutes and then returned to the protamine solution for eight hours. Thereafter, the film was removed from the protamine solution, rinsed thoroughly with distilled water and dried in air. The film was then placed between two chambers of an experimental cell. The electrolytic resistance of the film, as measured in the cell with 0.1 molar KCl contacting each face of the membrane was 3200 ohm-cm.$^2$. The cell was then emptied, rinsed and dried. One chamber was then filled with 0.04 m. KCl and the other with 0.02 m. KCl. The voltage across the membrane was measured by inserting a calomel electrode in each chamber, noting the potential difference between them and making the appropriate corrections for the asymmetry of the junction potential at the reference electrodes. The corrected voltage thus measured at $25 \mp 0.1°$ C. was 16.58 mv. The theoretically calculated value is 16.63 mv.

In an experiment identical to that described above except that one chamber contained 0.4 m. KCl and the other chamber contained 0.2 m. KCl, the measured voltage across the membrane was 15.80 mv. The theoretical calculated value is 15.95 mv. The favorable comparison between the calculated and the measured voltages in the above experiments illustrates the usefulness of protein impregnated unsintered PTFE membranes as membrane electrodes.

EXAMPLE 3

An unsintered polytetrafluoroethylene (PTFE) film, 0.007 inch thick and having a weight density of 1.77 g./cm.$^3$ was flooded with ethyl alcohol and immersed for 45 minutes in a 1% (wt.) bovine hemoglobin solution in isotonic saline, The film was then rinsed in distilled water, air dried and weighed. The weight gain was 0.062 g. per cm.$^3$ of membrane material.

The membrane was then placed as a separator between two chambers of an experimental cell. When so positioned, the membrane was flooded with ethyl alcohol, rinsed several times with distilled water and finally kept in contact with distilled water for five minutes to assure complete replacement of the alcohol with water. Thereafter one chamber of the cell was filled with 150 ml. of 1% (wt.) $H_3PO_4$ solution and the other chamber with 150 ml. of 1% (wt.) $CoCl_2$ solution. A platinum foil electrode was inserted in each chamber and the system electrolyzed at 2.0 ma. (0.4 ma. per cm.$^2$ of membrane) with the electrode in the $H_3PO_4$ chamber being made negative. After 6 hours of electrolysis, there was no transfer of cobalt to the chamber containing $H_3PO_4$ solution.

In an experiment identical to that described above except that the unsintered PTFE film was not treated with hemoglobin, the negative electrode in the $H_3PO_4$ chamber was covered with a fine dark blue mossy deposit after 30 minutes of electrolysis. This deposit was readily dissolved by reversing electrode polarity. These experiments illustrate the permselective property of the hemoglobin impregnated membrane, which under the conditions of the experiment is positively charged and is rendered impermeable to the positive cobalt ion.

EXAMPLE 4

An experiment was performed to demonstrate the enzymatic activity of a bound polypeptide material of the present invention. A quantity of urease was dissolved in 100 ml. of water and 5 ml. of the resulting solution was added to a solution of urea comprising 5 grams of urea in 95 ml. of water. The mixture was agitated and maintained at 30° C. Ammonia was produced at the rate of 12 mg. per minute from the reaction mixture, thus providing a measure of the activity of the enzyme solution.

A 0.004 inch thick unsintered PTFE film having an area of 25 cm.$^2$ and a density of 1.69 grams per cubic centimeter, was flooded with ethyl alcohol, immersed for one minute in distilled water and then submerged in the urease solution for 24 hours. Two such samples were prepared (Samples A and B). Sample A was removed from the urease solution, rinsed with distilled water and air dried. Sample B was similarly treated except that after being rinsed with distilled water it was kept flooded by storing it in distilled water. Sample B was thereafter submerged in the flooded condition, in urea solution containing 5 grams of urea per 95 ml. of water, at 30° C. Sample A was flooded with isopropyl alcohol, submerged thereafter in distilled water for 10 minutes and then transferred in the water flooded condition to a urea solution identical to the one in which Sample B was submerged. The solutions were gently agitated. The solution containing Sample A produced 14 mg. of ammonia per minute; the solution containing Sample B produced 23 mg. of ammonia per minute. This demonstrates that the bound enzyme was active.

Sample B was thereafter removed from the urea solution, placed in agitated distilled water for 6 hours and reinserted into the urea solution. Ammonia was produced at the rate of at least 21 mg./minute for a period of at least 35 minutes.

What is claimed is:

1. A bound polypeptide material comprising a porous unsintered solid fluorocarbon polymer having an atomic ratio of carbon to fluorine of from about 0.5 to about 2.0, and a polypeptide polyelectrolyte, said polypeptide polyelectrolyte being directly adsorbed to at least a portion of the surface of said unsintered fluorocarbon polymer.

2. A bound polypeptide material as in claim 1 wherein said fluorocarbon polymer is in the form of a continuous film.

3. A bound polypeptide material as in claim 1 wherein said fluorocarbon polymer is polytetrafluoroethylene.

4. A bound polypeptide material as in claim 1 wherein said polypeptide polyelectrolyte is an enzyme.

5. A bound polypeptide material as in claim 1 wherein said fluorocarbon polymer is chemically joined to a second polymer to form a graft or block polymer.

6. A process for producing a bound polypeptide material comprising the steps of:
   (1) providing a porous unsintered solid fluorocarbon polymer having an atomic ratio of carbon to fluorine of from about 0.5 to 2.0,
   (2) flooding said unsintered polymer with a water-miscible organic solvent, and
   (3) contacting the flooded unsintered polymer produced in step (2) with an aqueous solution of said polypeptide polyelectrolyte for a length of time sufficient to replace at least a portion of said organic solvent with said aqueous solution of polypeptide polyelectrolyte whereby said polypeptide is adsorbed directly to a portion of the surface of said unsintered polymer.

7. A process as in claim 6 wherein the flooded unsintered polymer produced in step (2) is flooded with water prior to contacting said polymer with an aqueous solution of polypeptide polyelectrolyte in accordance with step (3).

8. A process for producing a bound polypeptide material comprising the steps of:
   (1) providing a porous unsintered solid fluorocarbon polymer having an atomic ratio of carbon to fluorine of from about 0.5 to 2.0, said polymer being sufficiently hydrophilic as to become flooded upon contact with an aqueous solution of polypeptide polyelectrolyte, and
   (2) contacting said unsintered polymer with an aqueous solution of polypeptide polyelectrolyte for a length of time sufficient to, at least, flood said polymer with said polypeptide polyelectrolyte solution whereby said polypeptide is adsorbed directly to a portion of the surface of said unsintered polymer.

9. A bound polypeptide material as in claim 1 wherein said polypeptide polyelectrolyte is a protein.

References Cited
UNITED STATES PATENTS

| | | | |
|---|---|---|---|
| 3,705,084 | 12/1972 | Reynolds | 195—63 |
| 3,700,609 | 10/1972 | Tregar et al. | 260—112R |
| 3,252,948 | 5/1966 | Manecke et al. | 195—DIG. 11 |

DAVID M. NAFF, Primary Examiner

U.S. Cl. X.R.

195—68, DIG. 11; 260—112